Dec. 13, 1949  J. A. SHAW  2,490,840
GAS PURIFICATION PROCESS
Filed July 11, 1944
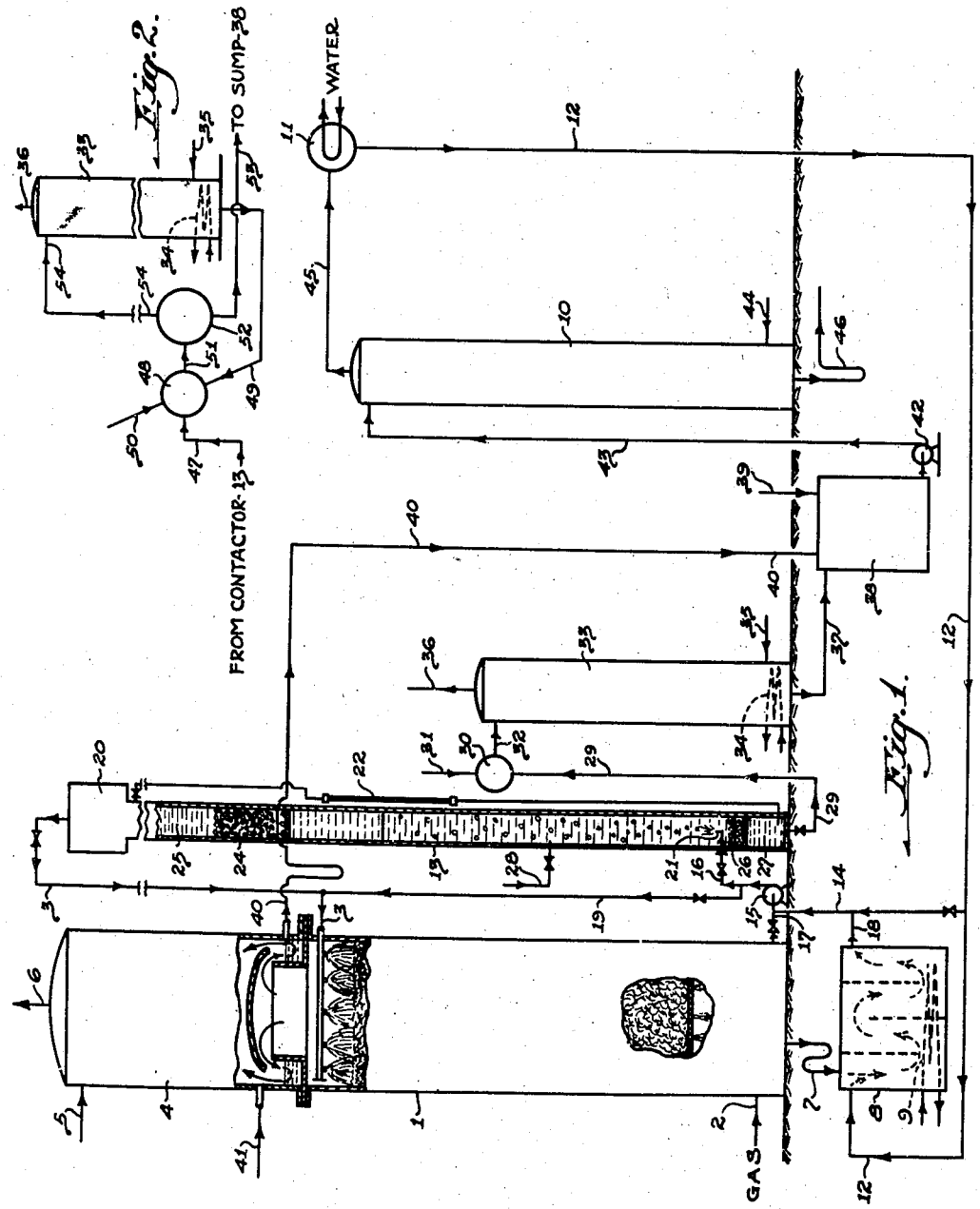
INVENTOR.
JOSEPH A. SHAW.
BY Edmund G. Borden
his ATTORNEY.

Patented Dec. 13, 1949

2,490,840

UNITED STATES PATENT OFFICE 2,490,840

GAS PURIFICATION PROCESS

Joseph A. Shaw, Pittsburgh, Pa., assignor, by mesne assignments, to Koppers Company, Incorporated, Pittsburgh, Pa., a corporation of Delaware Application July 11, 1944, Serial No. 544,420

17 Claims. (Cl. 23—2)

The present invention relates to a process for the purification of fluids and especially industrial gases for removal of sulphur.

It is known that suitable absorbents for acidic sulphur-containing constituents in gases can be selected from the organic nitrogen compounds known as the amines, and more especially primary and secondary amines. The more alkaline-reacting of these amines can be utilized in combination with some liquid gas scrubbing medium for absorbing organic sulphur compounds from gases. Usually, the absorbents are regenerated by heating to liberate the absorbed sulphur compounds from them. Often other constituents, especially oxygen-containing compounds, present in said to-be-purified gases bring about decomposition and loss of the employed amines, and what is even more objectionable, the resulting decomposition products are sometimes corrosive to equipment or form gummy deposits therein.

Further, sulphur compounds in the gas may form complex salts with the amines which will be precipitated in the scrubbing medium. In such instances, the precipitated salts, rather than the whole or a portion of the scrubbing medium, are treated for recovery of the amines. Plugging and channeling of scrubbing means, due to deposits therein of said precipitated salts and excessive partial pressure of the absorbed constituents from the said salts in contact with outlet gas are some of the objections to this manner of utilization of the amines.

The amines are usually relatively expensive and commercial success of a process depends largely on maintaining at a low figure the overall loss of amine, for example, vapor loss with purified gas, loss on revivifying scrubbing solution, loss due to conversion of amine to unrecoverable products. For gas scrubbing, the amines are usually dissolved in a liquid diluent, a so-called scrubbing medium, and the lower the amine concentrtion therein that will efficiently purify a gas the lower will be the above-mentioned vapor loss with outgoing purified gas. In the past amine concentration and thus vapor loss have been high. Purification of a gas with the desired amine involves the formation of a complex salt, usually a relatively heat-unstable compound, between the amine and the sulphur compound or compounds present in the gas. The liquid solvent with the amine has been heat treated to revivify it for further use, or the complex salt was allowed to precipitate and was separated from the scrubbing medium.

The primary object of the invention is to provide a process of separating sulphur compounds from a gas with an amine absorber for the sulphur compounds, such as carbon, disulphide, carbonyl sulphide and mercaptons, in which the amount of amine absorbent is only moderately in excess of the amount required for absorbing the sulphur compounds from the gas.

Another object of the invention is to provide a process of removing sulphur compounds from a gas wherein the sulphur compounds may be absorbed in an amine associated with an oil scrubbing medium, the amount of amine being only moderately in excess of that required for complete absorption of sulphur compounds, and revivifying the amino compounds in contact with the oil medium for use in a cyclic process.

A further object of the invention is to provide a process of separating sulphur compounds from a gas with an amino absorbent used in conjunction with an oil absorbing medium from which the sulphur compounds absorbed by the amines may be separated, the oil absorbing medium continuously returned to the process, and the amine associated with sulphur compounds may be separated from the sulphur compounds and continuously returned to the process for reuse.

A further object of invention is to provide process and apparatus for continuously removing constituents from a liquid by means of a therewith immiscible liquid of different gravity and more particularly for continuously revivifying amine-containing purification media employed in a fluid or gas purification process.

Another object of invention is to provide a process and apparatus for effecting efficient removal of sulphur compounds from fluids and especially gases, that permits employment of less basic amines or lower concentrations of more basic amines as absorption media.

Yet another object of invention is to provide a cyclic process embodying improved process and apparatus for employing amines that react with sulphur compounds, especially secondary amines in the removal of sulphur compounds from gases and for the subsequent recovery of reagent for reuse.

Still another object of invention is to provide an improved cyclic process for employing, for the removal of sulphur compounds from gases, secondary amines such as piperidine, morpholine, and their homologues individually or in a mixture of hydrogenated tar bases of wide or narrow boiling range.

The invention has for further objects such other improvements and such other operative advantages or results as may be found to obtain in the processes or apparatus hereinafter described and claimed.

In the accompanying drawing forming part of this specification, there is shown for purposes of exemplification, a preferred form of apparatus in which the invention may be embodied and practised. In connection with the description of apparatus, there will be given an example of the results obtainable in the practice of the invention using piperidine dissolved in wash oil as a scrubbing medium.

Figure 1 shows a diagrammatic flow sheet partly in elevation and partly in vertical section of apparatus for carrying out the improvement provided by the present invention; and Figure 2 illustrates a modification thereof.

In the apparatus shown in the figures, the purification of the gas takes place in scrubber 1, which is the well known packed tower. A stream of coke-oven gas flowing at the rate of 2000 cubic feet per hour from a light oil recovery plant, enters scrubber 1 through line 2 located near the bottom thereof and passes upwardly countercurrent to a descending flow of scrubbing medium, comprising a wash oil used for light oil recovery from gases that contain between about 3 and 5 grams per litre of piperidine. This scrubbing medium absorbs and reacts with sulphur compounds in the gas especially with sulphur compounds such as carbon disulphide, carbonyl sulphide, carbon hydrogen sulphide, mercaptans, and the like, each 100 cubic feet of gas containing about 7 to 8 grains of these organic sulphur compounds. The scrubbing medium enters scrubber 1 through line 3 at the rate of about 10 gallons per 1000 cubic feet of gas. The gas passing through the packed tower 1 contains traces of piperidine vapors and enters scrubber 4 located thereabove and passes upwardly countercurrent to a descending stream of water. As the gas also contains about 1.9% carbon dioxide by volume, the piperidine and carbon dioxide combine to form piperidine carbonate. Where carbon dioxide is not present in the gas, or alternatively in place of water there can be used hydrochloric or sulphuric acid solutions or a solution of a salt of a strong acid and weak base, such as a solution of ammonium sulphate. The water flowing at the rate of one gallon per 1000 cubic feet of gas enters scrubber 4 through line 5. Scrubber 4 is similar in construction to scrubber 1 but usually smaller in size and serves to remove traces of piperidine vapor from the purified gas. The purified gas leaves scrubber 4 through line 6 with its sulphur content reduced from 7 to 8 grains to 0.15 to 0.2 grain per 100 cubic feet, a removal of 97% to 98%.

For organic sulphur removal from gases the scrubbing medium generally comprises an amine or amines in a solvent diluent or carrier. Primary and secondary amines can be employed and secondary amines are especially useful because of their efficient absorption of sulphur compounds and the ease with which they can be recovered for reuse. Such secondary amines are in addition to piperidine and its homologues, morpholine and its homologues. There can also be employed a hydrogenated tar base fraction prepared from a fraction originally including pyridine, quinoline, isoquinoline, and their homologues and isomers. The hydrogenated portion of a tar base from which any unhydrogenated constituents have been separated may be used in a mixture without any further purification as an efficient absorption agent. The useful hydrogenated tar base fraction can comprise many compounds, which have a wide range of boiling points for example, piperidines, pipecolines, lupetidines, copellidines, tetramethyl piperidines, tetrahydro-, decahydro- and hexahydro-derivatives of quinoline and isoquinoline.

The solvent diluent or scrubbing medium is a solvent for the amines and for the formed sulphur complexes thereof. The scrubbing medium preferably should have a relatively low vapor pressure, thus preventing undue vapor losses to the purified gas. The scrubbing medium may be hydrocarbon oils, such as mineral oils and coal tar oils. It is usually preferred to employ the hydrocarbon oils, such as petroleum wash oils or straw oils, because of their availability and because they can serve as absorbents for sulphur compounds. The chemical and physical properties of the hydrocarbon oils vary, and these variations can be utilized to advantage in the present process, for example, the coal tar oils may be cyclic hydrocarbon oils, such as the creosotes which are usually better solvents for amine-sulphur complexes than petroleum oil fractions. Where high concentrations of sulphur compounds are encountered in a gas or where it is preferred to recirculate higher concentrations of said sulphur complex in a scrubbing medium, the coal tar oils rather than the mineral oils would be chosen.

The piperidine-wash oil scrubbing medium reaching the bottom of scrubber 1, passes through a line 7 and then flows to and through a baffled delay tank 8, requiring about one to one and a half hours for complete flow therethrough. The scrubbing medium contains free piperidine, a small amount of piperidine carbonate, where a carbon dioxide-containing gas has been scrubbed, as well as sulphur compounds. A portion of the sulphur compounds are dissolved by the wash oil, the remainder being combined with piperidine as sulphur complexes thereof. In delay tank 8 opportunity is given for the dissolved sulphur compounds in the wash oil to react with piperidine and form additional piperidine sulphur complex. Completion of the reaction between sulphur compounds and piperidine can depend on such factors as the means for bringing reactants into contact, temperature of the reaction medium, and concentration of the free amine. Progress of the reaction toward completion can be judged by empirical determination of decreasing total vapor pressure of uncombined sulphur compounds in the scrubbing medium. The delay tank 8 preferably is equipped with means for promoting contact of amine with sulphur compounds, such as means for direct agitation, baffles, concentric cylinders, or the like. A steam coil 9 in the delay tank can be employed to control the temperature of scrubbing medium and can serve to maintain gas in scrubber 1 above its dew-point.

Fresh piperidine and water obtained from a separation still 10, in the manner hereafter described, flows from a condenser 11 of still 10, through line 12 to delay tank 8, to build up the scrubbing medium piperidine content, which is being depleted by formation of amine-sulphur complex and other salt and volatilization losses in scrubbers 1 and 4. Alternatively, the fresh amine and water can be flowed directly from the condenser 11 of still 10 to a contactor 13 by means of a valved line 14, pump 15 and a valved line 16. It is preferred however, to flow the fresh supply of amine to delay tank 8, since it has been found that the increased concentration of amine therein hastens formation of said sulphur complex and thus reduces the delay period and also the size of the delay tank. However, where conditions permit the by-passing of said delay tank, the scrubbing medium from scrubber 1 can flow through valved line 17 to mix with fresh amine flowing through valved line 14, and thence by means of pump 15 and line 16 to contactor 13.

The use of a delay tank 8 has a number of advantages. Reaction between amines and, for example, organic sulphur compounds are not instantaneous or even very rapid, especially with amines that are relatively less alkaline in nature. A very important advantage is that concentrations of the amines present in scrubbing solutions can be appreciably reduced below those concentrations heretofore employed, without reducing scrubbing efficiency. For example, with piperidine, a ½% solution is effective to do the work for which a 1% solution was formerly required. In addition, the loss of amine to the purified gas is greatly reduced due to its decreased concentration in the scrubbing medium. The amine content of the scrubbing medium is only moderately in excess of the amount required for the sulphur removal from the gas. Without increasing capital costs for additional scrubbing means it has now been found that amines of lesser alkalinity which are excellent absorbers for the more acidic sulphur compounds but are not so active for removal of certain sulphur compounds from gases may be effectively used in combination with the absorbent hydrocarbon oils. This novel increase in the range of available and employable amines is made possible by the use of a delay tank. A further advantage is the more economical use of the more alkaline amines having relatively low boiling points and exhibiting higher partial pressures from solutions thereof.

A scrubbing medium having piperidine salts therein, such as piperidine sulphur complex and piperidine carbonate, flows from delay tank 8 by line 18, line 14, pump 15 and line 16 to contactor 13 to be revivified. Alternatively, a portion of the scrubbing medium without further treatment can be directly recycled from line 16, through valved line 19 and line 3 to scrubber 1. Contactor 13 is a long conduit of relatively small diameter, positioned vertically. For purposes of the present example, and for revivifying twenty to thirty gallons of scrubbing medium per hour the contactor was about forty-eight feet high and constructed of 2-inch pipe, except for a section 20 that was a piece of 8-inch pipe. The spent scrubbing medium from valved line 16 enters the contactor about two feet from the bottom thereof through spray 21 that can be a simple orifice or any device to create a turbulent flow of liquid upwardly through the contactor 13 in which is water, in the form of an unstable emulsion.

The piperidine-sulphur complex and other salts are dissolved out of the scrubbing medium by the water. At the same time, the available free piperidine is divided or partitioned between scrubbing medium and water, according to their partition coefficient, thus completing revivification of scrubbing medium. Division takes place between water and scrubbing medium at some point in the contactor. A sight glass 22 is placed adjacent a mid portion of contactor 13 by means of lines connected near the top and bottom of the contactor. The sight glass shows the line of division between the water and the scrubbing medium. Above the 30-foot level in the contactor are five feet of tower filling 24 and a quiescent zone comprising section 25 and enlarged section 20 used to destroy the unstable oil-water emulsion and produce a revivified oil substantially free of water. About six inches of tower filling 26 and an 18-inch settling basin 27 are sufficient to destroy any unstable oil-water emulsion, below spray 21 and produce a water solution substantially free of oil. A valved line 28 may be used for admitting water, or the like, to said contactor or even to admit emulsification or de-emulsification chemicals where they are required.

Revivified scrubbing medium, its piperidine content adjusted to 3 to 5 grams per litre and substantially free of water, flows from section 20 through a valved line 3 to scrubber 1 for reuse, whereas the water solution of piperidine-sulphur complex flows from settling basin 27 through valved line 29 for further treatment, the volume ratio of flow being about 75 parts scrubbing medium to one part water solution.

In contactor 13 water is preferred as being the cheapest and most available extracting medium for revivification. However, amine-sulphur complex and other salts thereof can be removed from the scrubbing medium by solutions of inorganic salts, for example, calcium chloride, sodium thiocyanate, and alkali hydroxides. Among the organic liquids suitable for revivification are tricresyl phosphate and glycerol. The contactor 13 also serves to regulate the concentration of the amine in the revivified scrubbing solution and bring it to the preferred concentration. Water or the like, employed as revivification medium should be immiscible with the solvent employed with amine, as gas scrubbing medium, in order that substantially complete separation will take place between them.

A water portion having piperidine, piperidine-sulphur complex and other salts dissolved therein, continuously flows from basin 27 of contactor 13 through line 29 to a mixing chamber 30 where the water solution is admixed with sulphuric acid or other acidic-reactant constituent, to form piperidine salt and free sulphur compounds. The sulphuric acid, or alternatively hydrochloric acid solution or a salt of a strong acid and weak base, for example, ammonium sulphate solution, is introduced into chamber 30 through line 31, the new admixture flowing therefrom in a line 32 to desulphurizer 33. The desulphurizer 33 can be any known type of contact apparatus, and is here shown as a stripping still. When required, heat can be supplied by coil 34 to raise the water temperature slightly. A line 35 positioned near the bottom of the desulphurizer is provided for supplying a stream of coke-oven gas at the rate of about one cubic foot per hour for stripping therefrom the free sulphur compounds that have relatively high vapor pressures, through a vent 33. A bottom outlet to line 37 is provided for the sulphur-free water solution of piperidine sulphate to flow to a sump 38.

Alternatively, the organic sulphur compounds that are present in the free state in chamber 30 and are relatively insoluble in the remaining water solution of amine salt can be separated by absorption with light oil, or by boiling said water solution and thereby vaporizing the organic sulphur compounds.

A water solution of piperidine sulphate, now free of organic sulphur, flows from desulphurizer 33 through line 37 to a tank or sump 38, wherein a sodium hydroxide solution, admitted thereto from line 39, reacts with the piperidine salt. Spent scrubbing solution from scrubber 4 comprising piperidine carbonate solution in water, formed by removing piperidine vapors from the purified gas, flows therefrom through line 40 to sump 38 where it joins and is treated along with piperidine sulphate from desulphurizer 33 as hereinabove described, for the release of free piperidine. Alternatively, a relatively strong base, such as a lime solution can be employed for the release of piperidine.

In the described example the present process is employed for the removal of sulphur compounds from a coke-oven gas also containing carbon dioxide. The carbon dioxide has a detrimental effect in scrubber 1, since some of it combines with piperidine to form piperidine carbonate. As an amine carbonate usually has a lower partition coefficient between water and scrubbing solution than has free amine, it is necessary to carry a higher concentration of total amine in the contactor water to maintain the preferred amine concentration in the revivified scrubbing medium. Where an extracting medium other than water is employed in the contactor for revivification, the respective partition coefficients should be empirically determined to assure efficient operation. As the volume of contactor solution, comprising principally amine sulphur complex, amine carbonate and amine in water, or the like, that is put through the recovery system is largely dependent on the amount of sulphur compounds removed from the gas, carbon dioxide in said gas places an increased load on the recovery system. Further, any carbon dioxide in the scrubbing system acts strongly to remove amine from the scrubbing solution when liquid water is also present. This is not troublesome during normal operation of the scrubbing step, but can become so where, for example, the incoming and to-be-purified gas is cooled in the gas scrubber below its dew-point. Steam coil 9 in delay tank 8 can serve as means for heating scrubbing solution to maintain the gas above the dew-point. However, the presence of carbon dioxide in the purified gas is of great benefit in scrubber 4, since it permits the use of a relatively small scrubber and a small quantity of water, rather than more expensive chemical solutions, for example, solutions of sulphuric acid or ammonium sulphate. Under such conditions the carbon dioxide in the purified gas stream quickly becomes absorbed by the amine, forming a soluble amine carbonate, whose amine partial pressure is low compared with that of free amine. Where carbon dioxide is not present in a gas but is available from an outside source, the carbon dioxide can be admitted to scrubber 4, through line 41. The amine carbonate solution requires the handling of smaller volumes of water in sump 38 and in still 10 to which the contents of sump 38 flow, by means of pump 42 and line 43.

The said still charge, where sodium hydroxide has been employed in sump 38, comprises piperidine, sodium carbonate, sodium sulphate, sodium hydroxide and water, is admitted near the top of still 10 and flows downwardly countercurrent to upflowing steam, admitted through line 44, the said steam serving to vaporize piperidine and some water. The so-produced vapors leave the still through line 45, flow to condenser 11 where they are condensed and are returned as a water solution of piperidine through line 12 to delay tank 8 or through valved line 14, pump 15 and line 16 to contactor 13. The still waste leaves the still 10 through line 46.

In the drawing, Figure 2 illustrates a preferred alternative method and means for decomposing piperidine-sulphur complex by means of carbon dioxide rather than by, for example, a mineral acid. Water solution of piperidine sulphur complex flows from contactor 13 by means of line 47 to carbonator 48, wherein it is admixed with about one half its volume of a creosote oil from line 49 and treated for fifteen minutes with carbon dioxide under 60 atmospheres pressure, from line 50. Alternatively, creosote oil can be replaced by another cyclic hydrocarbon such as benzene, or one of its homologues. The so-treated mixture now comprising creosote oil with about 97% of all the organic sulphur compounds dissolved therein and a water solution of piperidine carbonate is flowed through line 51 to separator 52 for gravity separation of the creosote oil and water solution. The water solution is flowed through line 53 to sump 38 and treated therein, as previously described, for the recovery of its piperidine content. The creosote oil solution of the free sulphur compounds is flowed through line 54 to desulphurizer 33 for revivification of said oil by means of coke-oven or other inert gas admitted thereto through line 35. The separated sulphur compound, vapors and gas are vented therefrom through line 36, whereas the revivified creosote oil is flowed therefrom through line 49 to carbonator 48 for further use. Another portion of water solution of piperidine-sulphur complex when subjected to about sixty atmospheres of pure carbon dioxide for thirty minutes without previous addition of creosote oil was found to have only about 80% of said sulfur complex decomposed. The value of creosote oil is obvious.

The temperature at which a gas is scrubbed with an amine-containing scrubbing medium has an effect on the efficiency and economy of the purification system. A temperature range defined by about 25° C. and 30° C. has been found most satisfactory. Below about 25° C. the efficiency of removal of sulphur compounds begins to decrease with a given amine concentration in the scrubbing medium. Above about 30° C. there is an appreciable increase in the loss of amine, as vapor, from scrubber 1, which throws an increased burden on scrubber 4, and thereby increases overall operation costs. Within limits, an increase in the circulation of scrubbing medium can offset a lower scrubbing temperature, or an increased circulation rate permits use of a lower amine concentration, where scrubbing temperatures remain constant.

Under the gas scrubbing conditions, possibly due to the large surfaces presented by scrubber walls and packing, some amines are converted to other products that may not be useful for the stated purpose. Generally such conversion, where present, is proportional to the amine concentration and can be appreciably reduced by an increased circulation of scrubbing medium containing a lower amine concentration. The novel process thus permits use of expensive amines, since the loss thereof can easily be kept within commercial cost limits.

As outlined in the description of apparatus, the absorption of sulphur compounds with piperidine, reduced the sulphur content of a gas from 7 to 8 grains to 0.15 to 0.2 grain per 100 cubic feet, a removal of 97% to 98%.

The following example illustrates the results obtainable with a hydrogenated tar base fraction; that is, a fraction comprising amines, usually predominantly secondary amines. Upon distillation of a crude tar base mixture there was separated a fraction boiling from about 135° C. to about 198° C., comprising 2-, 3-, and 4-picolines, 2,4-, 2,6-, and other lutidines, collidines, aniline and other unidentified materials. Upon hydrogenation and separation of the major portion of unhydrogenated material there was obtained a fraction of hydrogenated tar bases boiling from 120° C. to 186° C., having an average molecular weight of about 150 and a density of 0.836 at 25° C. The gas purification process above described utilizing piperidine was followed while using said hydrogenated material without further purification, all conditions being essentially the same except as will be hereinafter described. The gas leaving scrubber I after being scrubbed with a wash oil containing 5 grams per litre of the hydrogenated tar base fraction contained 0.40 grain per 100 cubic feet of sulphur, a removal of about 95% of the 8 grains per 100 cubic feet of carbon disulphide, carbonyl sulphide, carbon hydrogen sulphide, mercaptans, and the like, in the to-be-purified gas. Revivification of spent scrubbing medium in the contactor 13 was easily effected, the scrubbing medium volume ratio to sulphur complex water solution being 60 to 1. The sulphur complex was treated with 10% ammonium sulphate solution, rather than sulphuric acid, before being flowed to the desulphurizer.

The following example describes the results obtained by use of a primary amine such as monoethanolamine. In accordance with the procedure outlined for piperidine a gas containing 15.6 grains of carbon disulphide per 100 cubic feet of gas had its carbon disulphide content reduced to 8.4 grains on being scrubbed with a wash oil containing 10 grams per litre of monoethanolamine, a removal of about 46%. The water solution of sulphur complex obtained by extracting said wash oil was treated with acid and then alkali to recover the amine. About 95.5% of the monoethanolamine was thereby recovered.

With another primary amine, iso-octylamine the results were as follows: Under conditions similar to those outlined for piperidine, a gas had its carbon disulphide content reduced from 25.0 to 0.83 grains carbon disulphide per 100 cubic feet of gas on being scrubbed with a wash oil containing 10 millilitres per litre of iso-octylamine, a removal of about 96%. About 97% of the iso-octylamine was recovered from the water extract containing its sulphur complex.

The hereinabove described novel process for the removal of sulphur from gases can also be used to remove sulphur from other fluids, such as hydrocarbon oils, the amines being employed with or without solvent diluents. Likewise, the process can be employed for the removal of inorganic sulphur therefrom, for example, for the removal of hydrogen sulphide. The concentration of hydrogen sulphide, or the like in a to-be-purified fluid will be an important factor in determining size of equipment and quantity of chemicals to be employed in said process.

The process permits use of lower concentrations of amines than heretofore believed possible, the concentration being only moderately in excess of the amount required for absorbing the sulphur compounds from a gas. Cheaper amines of lower basicity, formerly unusable as not being sufficiently active, can be employed in moderate concentrations. Scrubbing solutions can be revivified or regenerated by the present process at ordinary temperatures, rather than the elevated temperatures of the prior art. Even with amine recovery at high temperatures it is not necessary to subject the whole volume of scrubbing medium to heat treatment, but only a small volume of solution of amine-sulphur complex. The use of a delay tank and contactor aid materially in securing the hereinabove described advantages.

Known liquid-liquid contact apparatus, such as a packed tower can be used to extract amine-sulphur complex from an oil with water. However, its scrubbing medium throughput capacity is low and substantially complete separation of the immiscible liquids, so essential in the present process, is impossible. In the present novel contactor a high scrubbing medium throughput capacity with good sulphur complex extraction and partition of amine took place in the unpacked conduit, when turbulence and an unstable emulsion of said liquids was produced. The provision of Raschig ring tower filling, or the like, and then a quiescent zone above and below the zone of reaction in an upright conduit of relatively great height in comparison to breadth did produce the necessary substantially complete separation of the immiscible liquids. In comparison with a packed tower, the novel contactor had almost double the scrubbing medium throughput capacity and delivered a revivified scrubbing medium with less than 0.1% water content, compared with a water content of over 1% for the packed tower. This novel apparatus is generally applicable where efficient chemical transfer of a constituent or constituents is to be effected between two immiscible liquids, followed by recovery of the liquids, each substantially free of the other.

The invention as hereinabove set forth is embodied in particular form and manner but may be variously embodied within the scope of the claims hereinafter made.

I claim:

1. A process for removing sulphur compounds from a fluid comprising: bringing said fluid into intimate contact with an amine-containing medium to dissolve sulphur compounds from said fluid and form an amine-sulphur complex; separating the purified fluid from a medium now comprising amine and amine-sulphur complex and extracting the amine-sulphur complex with a solvent which is immiscible with the medium; and recycling amine-containing medium into contact with to-be-purified fluid.

2. A process for removing sulphur compounds from a fluid comprising: bringing said fluid into intimate contact with a secondary amine-containing medium to dissolve sulphur compounds from said fluid and form an amine-sulphur complex; separating the purified fluid from a medium now comprising amine medium and amine-sulphur complex and extracting the amine-sulphur complex from the medium with water; and recycling amine-containing medium into contact with to-be-purified fluid.

3. A cyclic process comprising: scrubbing a gas with an amine associated with a hydrocarbon oil scrubbing medium to dissolve from said gas sulphur compounds and form an amine-sulphur complex; removing scrubbing medium from contact with the gas and reacting the dissolved sulphur compounds in the hydrocarbon oil with an amine to increase conversion to said amine-sulphur complex; extracting said complex from said scrubbing medium by means of a liquid in which the complex is soluble and which is immiscible with said medium; and returning so-treated scrubbing medium to said gas-scrubbing step.

4. A cyclic process for removing sulphur from gas, comprising: scrubbing the gas with piperidine dissolved in a hydrocarbon oil under conditions arranged to absorb sulphur from said gas and form a piperidine-sulphur complex; removing the scrubbing medium from contact with the gas and extracting piperidine-sulphur complex from the medium with water and returning so-treated medium to the gas-scrubbing step.

5. A cyclic process for continuously removing sulphur compounds from a stream of gases, also containing carbon dioxide, comprising: bringing the gas stream into contact with a piperidine-containing scrubbing medium to absorb sulphur compounds and some carbon dioxide to form respectively piperidine-sulphur complex and piperidine carbonate; then scrubbing the purified gas with water to absorb piperidine and carbon dioxide and form piperidine carbonate solution; treating scrubbing medium containing the piperidine-sulphur complex and piperidine carbonate with piperidine obtained from a subsequent step to increase conversion to piperidine-sulphur complex; treating the scrubbing medium with water to dissolve piperidine-sulphur complex, piperidine carbonate and some free piperidine therefrom and revivifying the scrubbing medium; returning the revivified scrubbing medium to the first scrubbing step; flowing the separated water containing piperidine-sulphur complex, piperidine carbonate and piperidine into contact with an acidic-reactant material to release sulphur compounds from piperidine-sulphur complex and form a salt of piperidine and acidic-reactant material in said water; heating the water mixture and blowing an inert gas therethrough to distill out organic sulphur compounds with said gas; flowing an admixture of the remaining piperidine salt solution and piperidine carbonate solution separated from gas in said second gas-scrubbing step into contact with a base; distilling the admixture and recovering piperidine therefrom and recycling the piperidine into contact with scrubbing medium after its separation from gas in the first scrubbing step.

6. A cyclic process for purifying gases of sulphur compounds, comprising: scrubbing the gas with a scrubbing medium comprising a hydrocarbon oil and piperidine to absorb sulphur compounds and form a piperidine-sulphur complex; scrubbing the purified gas containing piperidine vapors with a solution of ammonium sulphate to form a piperidine sulphate solution; treating spent hydrocarbon oil scrubbing medium with piperidine obtained from a later recovery step to react piperidine with absorbed sulphur compounds in the hydrocarbon oil and form additional piperidine-sulphur complex; flowing said admixture into contact with water to partition piperidine-sulphur complex and piperidine between the oil and water phases; separating and recycling the revivified oil phase to the gas scrubbing step; admixing separated water phase with ammonium sulphate solution to release sulphur compounds with formation of piperidine sulphate; boiling the solution to separate sulphur compounds; admixing remaining piperidine sulphate solution with piperidine sulphate solution separated from gas in the second gas-scrubbing step and treating the admixture with caustic alkali; distilling the admixture to separate piperidine and recycling the piperidine into contact with further quantities of scrubbing medium separated from gas in the first gas-scrubbing step.

7. A cyclic process for purifying gases of sulphur compounds, comprising: scrubbing the gas with a scrubbing medium comprising piperidine dissolved in a water immiscible solvent therefor to absorb sulphur compounds from the gas and form a piperidine-sulphur complex; scrubbing so-purified gas with a solution of an acidic reactant material chosen from the group consisting of carbon dioxide, acids and salts of weak bases and strong acids to absorb piperidine from the gas and form a piperidine salt with acidic-reactant material; allowing sufficient time for piperidine and substantially all sulphuric compounds to react and to form additional piperidine-sulphur complex in the scrubbing medium; admixing said medium and fresh piperidine, obtained from a later step in the process, and flowing the admixture into contact with water to partition piperidine-sulphur complex and piperidine between scrubbing medium and water; separating said medium from water solution and recycling said medium to the first gas-scrubbing step; admixing the separated water solution of piperidine-sulphur complex and piperidine with a coal-tar hydrocarbon oil and treating the admixture under pressure with carbon dioxide to produce a water solution of piperidine carbonate and free sulphur compounds dissolved in coal-tar oil; separating water and oil phases; blowing an inert gas through the oil phase to vaporize and separate therefrom the sulphur compounds; recycling said oil into admixture with further quantities of separated water solution containing piperidine-sulphur complex and piperidine; admixing the separated water phase with piperidine salt solution separated from gas in the second gas scrubbing step and treating the admixture with alkali; distilling the admixture and recovering free piperidine therefrom and recycling the piperidine into contact with scrubbing medium and water in a revivification step.

8. A process for removing sulphur compounds from a gas comprising: bringing the gas into intimate contact with a mixture of hydrogenated tar base, from which unhydrogenated compounds have been removed, and a hydrocarbon oil absorbent; separating gas from the absorbent mixture; adding additional hydrogenated tar base to said absorbent mixture to form a tar base-sulphur complex with sulphur compounds formerly absorbed in the oil, then adding water to dissolve the tar base-sulphur complex; decomposing the hydrogenated tar base-sulphur complex to separate sulphur compounds from the hydrogenated tar base; and recycling hydrogenated tar base and oil back to the absorption step for treating gas to be purified.

9. A cyclic process comprising: bringing a gas into contact with a secondary amine associated with a hydrocarbon oil scrubbing medium to dissolve from said gas sulphur compounds and to form an amine-sulphur complex, removing scrubbing medium from contact with the gas, adding a predetermined amount of fresh amine to the scrubbing medium and holding the mixture in contact for a sufficient time for dissolved amine and sulphur compounds in the hydrocarbon oil to form additional amine-sulphur complex, extracting the sulphur-amine complex in the mixture with a liquid which is immiscible with the hydrocarbon oil and acts as a solvent for the sulphur-amine complex, separating the amine-sulphur complex solution from the hydrocarbon oil-amine absorbing medium, and returning from the extracting zone to the scrubbing zone a mixture of hydrocarbon oil having a predetermined concentration of amine therein.

10. A process for removing sulphur compounds from a gas comprising: bringing the gas into intimate contact with a mixture of hydrogenated tar bases containing amines in an absorbing medium to dissolve sulphur compounds from the gas and to form an amine-sulphur complex, separating the treated gas from said absorbing medium now comprising amine and amine-sulphur complex from the amine absorption medium with a liquid which is immiscible with the absorption medium and is a solvent for the sulphur-amine complex, separating the dissolved amine-sulphur complex from undissolved amine absorption medium and recycling the amine absorption medium back to gas contacting zone.

11. A cyclic process comprising absorption and revivification steps for removing sulphur compounds from gases comprising: scrubbing gas with an amine-containing medium and absorbing sulphur compounds to form an amine-sulphur complex thereof; removing scrubbing medium from contact with the gas; adding to said medium a predetermined amount of fresh amine to form amine-sulphur complex with sulphur compounds formerly absorbed in said medium, adding a liquid which is immiscible with said medium to dissolve the amine-sulphur complex, and returning said medium freed of amine-sulphur complex but containing free amine of a predetermined concentration to the gas contacting stage.

12. A cyclic process for removing sulphur compounds from gas comprising: scrubbing the gas with a scrubbing medium containing a secondary amine to dissolve sulphur compounds from the gas and form an amine-sulphur complex, removing the scrubbing medium from contact with the gas and treating the so-separated medium with a predetermined amount of amine to form an amine-sulphur complex with sulphur compounds dissolved in the medium, separating by water partition the scrubbing medium into an oil-amine solution with a predetermined concentration of amine and a water solution containing amine-sulphur complex, recycling the oil-amine medium to the gas scrubbing step, reacting the separated water solution of amine-sulphur complex with an acid-reactant material to release sulphur compounds therefrom by formation of a new amine salt, passing an inert gas through the new amine salt to strip sulphur vapors therefrom, reacting the residual amine salt with an alkali to release free amine, separating the free amine and recycling it to the scrubbing medium introduced into the gas scrubbing step.

13. A cyclic process for the removal of sulphur compounds from gas comprising: scrubbing the gas with a scrubbing medium containing secondary amine to absorb sulphur compounds and form an amine-sulphur complex; then flowing the gas into contact with an acidic-reactant solution to remove amine from the gas and form an amine salt; treating the scrubbing medium with a solvent for the amine-sulphur complex that is immiscible with scrubbing medium; separating the scrubbing medium from the solvent; reacting the separated solvent solution with an acidic-reactant material to separate sulphur compounds from the amine-sulphur complex; passing an inert gas through the treated amine-sulphur complex to vaporize and remove sulphur compounds from the new amine salt; adding the new amine salt to the first mentioned amine salt and reacting said admixture with a base to release free amine from salt thereof; distilling the treated admixture to recover amine therefrom; and adding the so-recovered amine to the scrubbing medium for return to the gas-scrubbing step.

14. A process for removing sulphur compounds from a gas comprising: bringing the gas into intimate contact with a mixture of hydrogenated tar bases containing amines in an absorbing medium to dissolve sulphur compounds from said gas and to form an amine-sulphur complex, separating the purified gas from a mixture now comprising amine-medium and amine-sulphur complex, treating said mixture with a liquid which is immiscible with the amine-absorption medium to dissolve the amine-sulphur complex, separating the dissolved amine-sulphur complex from the amine-absorption medium, and recycling the amine-absorption medium back into contact with the gas to be purified.

15. A process for removing sulphur compounds from a gas comprising: scrubbing the gas with an amine compound associated with an absorbent oil medium capable of absorbing sulphur compounds wherein the concentration of the amine compounds in the oil medium is not greater than 0.5% by weight of the oil; separating the amine-oil medium containing the absorbed sulphur compounds from the gas, reacting the sulphur compounds in the oil by adding additional amine to form an amine-sulphur complex, separating the amine-sulphur complex from an oil-amine absorption medium by the water partition, decomposing the amine-sulphur complex by adding an acid material thereto, stripping sulphur compounds out of the decomposed amine-sulphur complex mixture and returning the oil-amine medium from the separating zone to the scrubbing zone in a cyclic process.

16. In a process for removing sulphur compounds from a gas comprising: scrubbing the gas with an amine in a hydrocarbon oil medium to absorb sulphur compounds and form amine-sulphur complexes, separating the amine-sulphur scrubbing medium from the gas, dissolving the sulphur-amine compounds in water to separate the sulphur-amine complex from an oil-amine complex, separating the water solution of the sulphur-amine complex from the oil-amine absorption medium by gravity partition, decomposing the water solution of the sulphur-amine complex with an acid-reacting medium, stripping sulphur compounds out of the decomposed solution and returning the oil-amine absorption medium to the scrubbing zone in a cyclic process.

17. A process of removing sulphur compounds from a gas comprising: scrubbing the gas with an amine in a hydrocarbon oil medium to absorb the sulphur compounds, separating the amine scrubbing medium from the gas, separating the sulphur compounds from the oil medium with water and additional amine to form a sulphur-amine complex, separating the water solution of amine-sulphur complex from the oil medium, reacting the water solution of amine-sulphur complex with an acid to release sulphur compounds therefrom distilling the water amine solution to separate sulphur compounds from the amine, and returning the amine to the scrubbing step in a cyclic process.

JOSEPH A. SHAW.

REFERENCES CITED

The following references are of record in the file of this patent:

UNITED STATES PATENTS

| Number | Name | Date |
|---|---|---|
| 679,575 | Reese | July 30, 1901 |
| 1,621,441 | Suida | Mar. 15, 1927 |
| 2,161,663 | Baehr, et al. | June 6, 1939 |